United States Patent [19]
Miro et al.

[11] Patent Number: 5,756,219
[45] Date of Patent: May 26, 1998

[54] INDUSTRIAL STRETCH FILMS

[75] Inventors: Sergey Miro, Secaucus, N.J.; William L. Harkey, Concord, N.C.

[73] Assignee: AEP Industries, Inc., South Hackensack, N.J.

[21] Appl. No.: 591,168

[22] Filed: Jan. 16, 1996

[51] Int. Cl.$^6$ .................................................. B32B 27/08
[52] U.S. Cl. ........................... 428/516; 428/515; 428/910
[58] Field of Search .................................. 428/516, 515, 428/910

*Primary Examiner*—E. Rollins Buffalow
*Attorney, Agent, or Firm*—Hopgood, Calimafde, Kalil & Judlowe LLP

[57] ABSTRACT

The invention provides a stretch wrapping film (i.e., non-heat shrinkable) having (i) skin layers and (ii) at least one core layer which includes at least 25% by weight, more preferably from about 60% to about 90% by weight (of the layer composition) of a propylene polymer, preferably a propylene homopolymer; for the film as a whole, the propylene content ranges from about 10% to about 65% by weight (of the film). In more preferred embodiments, the films include skin layers, intermediate layers, and a core layer. At least one of the intermediate and core layers contains the propylene polymer, which is preferably a homopolymer or a blend of homopolymer with linear low density polyethylene (LLDPE); the skin layers comprise an ethylene polymer, preferably a tacky LLDPE composition. These films have improved strength and tear and puncture resistance, and are especially suited for industrial wrapping of loaded pallets and other large objects such as furniture. These films are especially advantageous in providing a high holding force.

42 Claims, 1 Drawing Sheet

INDUSTRIAL STRETCH FILMS

BACKGROUND OF THE INVENTION

1. Field of the Invention

This invention relates to overwrap films especially designed for wrapping large objects, to structures and compositions for such films, to methods for making such films, and to methods of using such films.

2. The State of the Art

In general, overwrap films have been used for packaging various types of goods, from retail foods and cigarettes to carpets and furniture. Industrial overwrap films are designed for wrapping loaded shipping pallets and large articles such as furniture, carpets, books, and the like.

Industrial overwrap films typically are provided as one of two types, which types are either stretched around or shrunk over the object packaged. A stretch overwrap film is used by being stretched around the object and then adhered to itself; the tendency of the adhered film to resist further stretching provides a load containment force. For using overwrap shrink film, the film is wrapped around the object and then shrunk, typically by heating, to provide a load containment force.

Industrial overwrap films are typically based on a single layer or multilayer film comprising ethylene homopolymer or a copolymer of ethylene. Because of the relative largeness and/or heaviness of the wrapped items, these industrial films require a certain degree of toughness, as well as significant resistance to puncture and tearing. These industrial films should also exhibit dimensional stability: once the article is wrapped, the overwrap film should neither stretch, which would allow the wrapped articles to shift and possibly escape the wrapping, nor shrink, which could damage the wrapped article.

Shrink overwrap films are typically biaxially oriented at an elevated temperature and then cooled in a biaxially stretched state; shrinkage of the film is promoted upon reheating to the elevated orientation temperature. The shrink overwrap film and overwrap heating apparatus are designed to provide a desired degree of shrinkage during reheating of the film; reheating the film causes shrinkage, and so the shrinking film encased the wrapped articles. The degree of shrinkage of such shrink overwrap films must be controlled to avoid damaging the wrapped articles due the film's shrinkage force.

An additional intended property of typical overwrap films, of both the stretch and shrink varieties, is adhesion of the film to itself and/or to the article being wrapped. Generally, the lower the density of the polyethylene, the tackier or stickier the material. Thus, one method for adhering the film is by self-adhesion, where one surface of the film is tacky and is wrapped onto and adhered to itself. Another method of adhering the film to itself, especially suitable for shrink films, is by overlapping ends of the film and heat-sealing, effectively melting the overlapped portions to each other, and cooling to create a weld.

Overwrap films are often designed to have properties dependent upon the particular customer or end-user. To achieve these properties, the film may be coated with an adjuvant to create a sticky outer layer or a slippery outer layer. A different method of altering the various surface properties of the film is to create a multilayer film wherein a core layer, having properties desired for the internal structure of the film, is sandwiched between skin layers, having the desired properties for the exterior of the film. One of the problems with these multilayer structures is compatibility of the various layers, which can impair the integrity of the unitary multilayer structure. To avoid separation or delamination of the layers, multifarious approaches, including adhesives and bi-adherent (tie) layers between the various structural layers, can be used to keep the structural layers of the multilayer film together as an integral film.

There are a variety of methods for making multilayer films. Although solvent (wet) casting and other methods are suitable for some films, polyolefin films are generally made by starting with at least two polymer melts which are formed into a multilayer film by coextrusion, using both blown and cast extrusion techniques, and by lamination of extruded films. Perhaps the first such laminate was a plastic film known as "triKor" (Kordite Corp.; see *Plastics Film Technology*, Ed. by W. R. R. Park (New York: Van Nostrand Reinhold Colo., 1969)) which comprised two skin layers of 0.40–0.45 mil medium density polyethylene and a core of 0.10–0.20 mil polypropylene; the film was designed specifically for wrapping bread loaves.

Breidt, Jr., et al., in U.S. Pat. Nos. 4,147,827 and 4,197,150, describe a coextruded, heat-sealable, oriented laminar (laminated) film having a core of ethylene-propylene copolymer or a polypropylene, and skin layers having a polyethylene content of at least 80%. The polyethylene has a density of 0.91–0.936 and a MI (melt index) of 0.30–20.0.

Mueller, in U.S. Pat. No. 4,194,039, describes a multilayer polyolefin shrink film having a core layer of ethylene homo- or copolymer blended with butylene homo- or copolymer, and skins of propylene homo- or copolymer; the core comprises 50–80% of the total thickness of the film. The films are oriented and heat shrinkable, and can be made by coextrusion.

Cooper, in U.S. Pat. No. 4,436,788, describes a composite stretch wrap film suitable for wrapping pallets which comprises a film of ethylene vinyl acetate (4–25% vinyl acetate content) and optional skin layers of polyethylene or ethylene-alkene copolymer (e.g., linear low density polyethylene) having a density of 0.917–0.945.

In spite of the foregoing, there remains a need for stretch wrapping films having improved properties; namely, improved stretch levels, puncture resistance, tensile strength, tear strength, a higher holding force, and desired cling properties.

SUMMARY AND OBJECTS OF THE INVENTION

In view of the foregoing, it is an object of this invention to provide a stretch wrapping film having improvements in at least one of such properties as stretch level, puncture resistance, tensile strength, tear strength, holding force, and cling.

Yet another object of this invention is to provide an improved stretch wrapping film which is economically feasible to use and which provides the desired, if not improved, properties necessary for a commercially suitable industrial stretch wrapping film.

In summary, the present invention provides an improved multilayer film composition and structure that comprises (i) at least one interior core layer having at least 25% by weight of polymerized propylene monomer and (ii) opposing skin layers having at least 5% by weight of polymerized ethylene monomer. The total amount of polypropylene in the core layer, which can be present in one or more core layers, comprises at least 25% of the weight of the layer (approximately equal to the fractional thickness of the total film), more preferably at least 50 wt. %, and most preferably 70–95 wt. %. In various other embodiments, one or both skin layers can be fabricated with a tacky composition to provide self-adherence without the use of heat.

In another aspect, the present invention provides the novel film as just described by coextruding at least three, preferably at least five, and possibly more, layers simultaneously to form the novel multilayer film.

DETAILED DESCRIPTION OF PARTICULAR EMBODIMENTS

Figure 1:
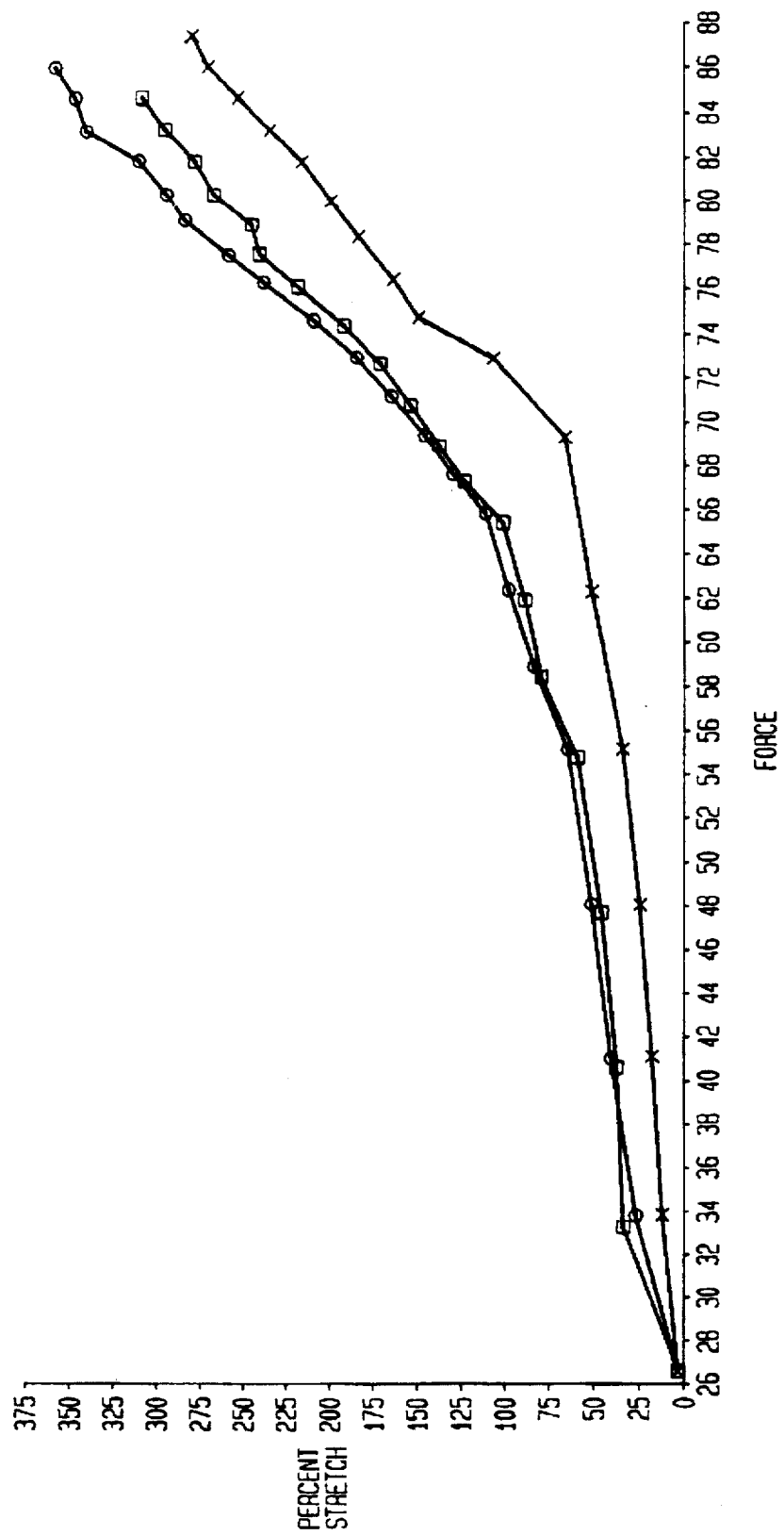
FIG. 1 depicts a graph of the holding force for a multilayer industrial stretch film according to this invention and for comparable films having inferior properties.

The present invention relates to stretch packaging film, especially for industrial packaging of heavy and/or bulky items, including furniture, carpets, equipment (military, industrial, medical, analytical, and the like), and so on. As described in the Background, multilayer films can be made by blown or cast co-extrusion, and by lamination; the present invention is described with reference to cast, co-extruded films, although other methods are also suitable.

Unlike industrial shrink overwrap films, the present stretch films are essentially oriented only in the machine direction (i.e., the direction of extrusion). Novel stretch films according to certain embodiments of this invention can be self-adhered by heating, ultrasound, adhesive joining, or, most preferably, by inherent tackiness of one or both skin layers. These novel multilayer films have at least two compositions disposed in three layers (e.g., the structural composition A/B/A) and preferably have at least three or four compositions disposed in four or five layers (e.g., A/B/C/D, A/C/B/C/A, and A/C/B/C/D, wherein A, B, C, and D each represents a particular polymer composition in a particular location within the multilayered structure).

Structurally, the novel films of this invention are multilayer films having two outer skin layers and at least one core layer.

At least one, and preferably both, of the skin layers comprises a film-formable, ethylene-based polymer, preferably in the form a copolymer of ethylene and at least one higher α-olefin monomer, particularly, linear low density polyethylene (LLDPE). Suitable higher α-olefin monomers are selected from the group consisting of $C_4$–$C_{12}$ α-olefins, including both straight and branched chain α-olefins (e.g., 4-methylpentene-1), and mixtures thereof, and preferably even numbered $C_4$–$C_8$ α-olefins. LLDPEs are ethylene-based copolymers generally having a density between about 0.89 and about 0.926; preferred for this invention are those derived from copolymerization of ethylene with butene (LLDPE-butene), hexene (LLDPE-hexene), and octene (LLDPE-octene). Each skin layer may comprise a compatible mixture, blend, or alloy of an LLDPE with another polymer, preferably also an ethylene-based copolymer, but any compatible polymer (or one which can be rendered compatible by the addition of a compatibilizing adjuvant) is suitable. The skin layers together preferably comprise at least 10% of the film (e.g., each preferably comprises at least 5%), more preferably about 10–50%, even more preferably about 20–45%, and most preferably about 30–40% of the film. (Unless otherwise noted, all percentages are weight percentages having the film or the particular layer as the basis, depending upon context.)

The novel films also contain at least one core layer, and preferably include at least two core layers of the same or different compositions than each other, and different from the skin layers. As used herein, a layer of the film internal to a skin layer is a core layer; when the film contains a multiple core layers, reference may be made to "intermediate" layers as structurally between the skin and another core layer.

At least one of the core layers (or intermediate layers) comprises a film-formable polymer having at least 25%, more preferably at least 50%, even more preferably 60%±40%, even more preferably 70%±25%, and most preferably 80%±15% polymerized propylene monomer. The preferred, film-formable propylene-based polymer is a film-formable propylene homopolymer. Copolymers of propylene with ethylene and/or with higher α-olefin monomers (as defined above) are also suitable, as are compatible mixtures, blends, and alloys of propylene homo- or copolymers with other compatible polyolefins. Based on the film as a whole (e.g., a cross-sectional composition), preferably at least 10% is comprised of propylene units, more preferably at least about 15%, most preferably in the form of propylene homopolymer. The maximum preferable amount of polypropylene (or propylene units if a copolymer) in the film as a whole is about 65%, more preferably not more than about 25%.

It should be understood that "copolymer" as used herein includes two or more different monomers, as well as film-formable polymers having reactive pendant groups (e.g., acids and salts thereof); thus, olefin copolymers suitable for use in this invention include copolymers of ethylene and acrylic acid, methacrylic acid, and/or vinyl acrylate, and include the salts thereof (i.e., what is typically called an ionomer) to the extent such composition is capable of being formed into a film and is compatible with the immediately adjacent layer(s) of the film. Further, "α-olefin" is intended to include polyene compounds (e.g., butadiene) having an olefinic moiety in the α-position and which is polymerizable with ethylene or propylene.

As mentioned above, the novel films of this invention include at least one and preferably at least three physically distinct core layers. (Each core or intermediate layer can be derived from multiple simultaneously extruded layers of the same composition which bond to create a single layer having a unitary composition.) In an especially preferred embodiment of this invention, the film comprises a central core layer of ethylene copolymer surrounded by intermediate core layers comprising propylene copolymer or a blend of propylene homopolymer or copolymer with ethylene homopolymer or copolymer, all sandwiched between skin layers of ethylene copolymer. An alternative preferred embodiment includes: a central core layer comprising propylene homopolymer, a copolymer thereof, or a blend of either with ethylene copolymer; opposing (i.e., sandwiching) intermediate core layers of an ethylene copolymer or a blend of ethylene copolymer with another ethylene copolymer; and skin layers comprising an ethylene copolymer or a blend thereof with another ethylene copolymer, the composition of the skin layers being different from that of the intermediate core layers. Still another preferred embodiment comprises multiple core/intermediate layers (at least two), each of which comprises propylene homopolymer, a copolymer thereof, or a blend of either with ethylene copolymer, and skin layers comprising a composition different from that of the core and intermediate layers, especially ethylene copolymer; more preferably, the film comprises a core and surrounding intermediate layers, each of which includes propylene units, all sandwiched between skin layers of LLDPE, to form a five layer film. In the most preferred embodiments, the ethylene copolymer is a LLDPE. The intermediate core layer(s) and skin layers may each be of the same or of different compositions than any other respective intermediate core and skin layer(s).

As mentioned above, it may be preferable to provide a film wherein both skin layers are tacky, one of the skin layers is tacky, or where both skin layers are slippery (i.e., not tacky). For example, customers very often desire to have their articles wrapped in a film having a tacky interior. In such a film, one of the skin layers (that which will be facing the articles wrapped) is provided as a tacky composition and the other skin layer is provided as a non-tacky composition. The composition a film having only one tacky side is "one-sided cling" ("OSC"), the other side (skin) being a non-clinging (i.e., "slip") composition; two tacky sides provides a "double-sided cling" ("DSC") film. A cling film has the advantage of being a film that can be adhered to itself during the overwrap by overlapping the film (at the overlap there will at least one cling surface, and so the films will adhere). Another advantage of an OSC film when the interior is the cling side is that the articles wrapped into a bundle are adhered to the film and so are prevented from shifting. Likewise, an OSC film used with the inside as the cling surface provides bundles that do not stick to each other, and so loading and unloading is facilitated as the bundles slide over each other. One advantage of a DSC industrial stretch film, depending upon particular shipping applications, occurs when bundles of wrapped items are stored and shipped together: the presence of a tacky exterior can act to hold the separate bundles together when they are touching, thereby preventing the articles from shifting during transportation; however, such films may tend to tear because of the adhesion of the outside cling layer.

To achieve a tacky layer, the composition preferably includes a LLDPE that is tacky. Tackiness is related to the density (lower density is more likely to promote tackiness) and the molecular weight distribution of the polymer (a wide distribution with a number of lower molecular weight areas promotes tackiness). Resin manufacturers are well-acquainted with the tackiness characteristics of their resins and typically advertise particular resins as suitable for tacky or non-tacky skin layers in multilayer applications; refer, e.g., to Simmons, U.S. Pat. No. 5,273,809 (the disclosure of which is incorporated herein by reference) for a discussion of stretch films having cling properties and skin layers of LLDPE copolymers. Also, the method in which the resin is cast will effect the tackiness of the final film; a cast film is smoother and thus typically tackier than a blown film; tackifiers are typically added to blown films. Optionally, or in addition to the presence of an LLDPE, tackiness can be provided by the addition of a tackifier, such as a polyisobutylene, in amount of about 1-10% by weight of the layer.

On the other hand, it may be desirable to have the exterior of the wrapping very slippery to facilitate loading or conveying the bundles (while at the same time optionally providing the interior of the wrapping with a tacky composition).

To achieve a non-tacky or slip layer, the composition used for forming the skin layer can be provided with a lubricating or slip agent. Preferred slip agents include higher acids and their salts, such as stearic acid and calcium stearate, as well as compounds such as erucamide, cis-13-docosenamide, and 9-octadecenamide, or a compatible mixture thereof, in an amount of at least about 0.01 wt. % up to about 2 wt. %, more preferably in amounts of 0.25-1.5 wt. %, and most preferably in amounts of 0.5-1.0 wt. %. As an alternative to, or in addition to, adding a slip agent, the non-tacky layer in preferred embodiments comprises all or essentially all medium density ethylene homopolymer or copolymer (e.g., density of from about 0.926 to about 0.94), or a blend of medium and/or high density ethylene homopolymer or copolymer with LLDPE. If a high density ethylene homopolymer or copolymer is used in the latter composition, such high density polymer preferably is present in an amount effective to render the LLDPE non-tacky, generally in an amount of from about 10% to about 50% of the layer composition.

In one particular embodiment, the skin layers are of the same composition and comprise a mixture of various ethylene copolymers. More preferably, the mixture comprises LLDPEs having densities of not more than about 0.92 (g/cc). Also preferable is a mixture of LLDPEs having different Melt Indices (Melt Index is a standardized measure of polymer viscosity). A higher Melt Index implies a more flowable and thus softer (less stiff) polymer, leading to a softer and less rigid film. A LLDPE made with a relatively longer chain monomer, such as octene, although more expensive than one made with a shorter chain monomer, such as hexene, will provide a stronger film. Accordingly, one can balance the desired flexibility and strength of the ultimate film by varying the types and amounts of comonomers and/or LLDPEs used.

To facilitate compatibility among the various layers of the multilayer film, it is preferable to include the same particular polymer composition, to some extent (preferably at least about 5%), in each layer. Although not essential for practicing this invention, it is known that more similar compositions used for adjacent layers are more likely to form an integral bond, and so avoid delamination of the multilayer film or the need for separate adhesive or compatibilizing layers. In an alternative embodiment, separate layers adherable to both the skin and the core (or intermediate) layer can be used to assure the integrity of the multilayer film; such layers are typically called "tie" layers because they act to tie together layers of disparate compositions.

The multilayer films of this invention can be made by any of the conventional processes for making multilayer films, such as co-extrusion (by blown or cast techniques) and lamination. In general, as described herein for casting extrusion, the starting polymer compositions are provided from the manufacturer as pellets, flakes, or some other flowable solid form that can be fed into an extruder (suitable commercial extruders include the Series 435 and Series 460 extruders available from Black-Clawson, Fulton, N.Y.). The extruder melts the starting materials and forces the polymer melt under pressure through an extrusion die (e.g., a slot die) into the geometry of a film. For multilayer films, melts from multiple extruders are used to provide the multiple compositions desired for a particular multilayer film. For the particular films formed and described in this application, multiple extruders (one for each composition used in a particular layer) feed into one or more manifolds in a feedblock, which directs each of the flows to outlets associated with the slot die (suitable feedblocks are commercially available from The Cloeren Co., Orange, Tex.). The feedblock outlets are positioned to provide the desired geometric arrangement of the layers in the multilayer film. Immediately after extrusion, the multilayer sandwich is contacted by one or more chill rolls to cool the film and set the structural composition of the ultimate film. The resulting multilayer film can be handled and conveyed by conventional winder and roller apparatus for commercial speed production of films, and finally the film can be taken onto a wind-up spool or roll.

During the manufacture of these films the resin melts are typically extruded at a thickness about 30 mils from the die; generally 15-50 mils for cast films and 20-120 mils for blown films. From the die, the film is drawn down to its final thickness and then passed over the chill roll (as noted above). Thus, the present films are oriented in the machine direction only; compared with typical shrink films, the present stretch films exhibit a shrinkage upon heating comparable with shrink films in the machine direction, but only 0–15% expansion in the transverse direction. Films made according to this invention and used for wrapping preferably have a thickness of not more than about 2 mil (i.e., 0.002 in.), and more preferably have a thickness of 0.4–0.9 mil, most preferably about 0.6–0.8 mil; accordingly, the drawdown generally ranges from about 3000% to about 4500%. Exemplary wrapping devices suitable for using the novel films of this invention include H-series stretch wrappers available from LanTech (Louisville, Ky.) and from Highlight Industries (Grandville, Mich.), and L- and M-series stretch wrappers available from Orion (Memphis, Tenn.).

EXAMPLE 1

A multilayer film was prepared from three layer compositions, identified as A, B, and C in Table 1.

TABLE 1

| Layer Composition | Resins | % Resin in Layer Composition | Layer as % of Total Film | Resin as % of Total Film |
|---|---|---|---|---|
| A | LLDPE-hexene (1) | 30 | 24 | 7.2 |
|   | LLDPE-octene | 60 |    | 14.4 |
|   | LLDPE-hexene (2) | 10 |  | 2.4 |
| B | LLDPE-octene | 50 | 58 | 29.0 |
|   | LLDPE-hexene (2) | 50 |   | 29.0 |
| C | LLDPE-hexene (2) | 20 | 18 | 3.6 |
|   | Propylene homopolymer | 80 |  | 14.4 |

LLDPE-hexene(1) denotes a commercially available linear low-density polyethylene having a MI (Melt Index) of 2.5 (g/10 min.) and a density of 0.910; LLDPE-hexene(2) denotes a commercially available polyethylene having a MI of 1.0 and a density of 0.917; LLDPE-octene denotes a commercially available polyethylene having a MI of 3.2 and a density of 0.917; and Propylene homopolymer denotes a commercially available polypropylene homopolymer having a MFR (melt flow rate) of about 3.0–4.2.

Each of the resin mixtures used as the composition for a particular layer in this multilayer structure was mixed in a separate extruder to provide the lettered layer compositions A, B, and C as shown in Table 1. Each of these lettered layer compositions used in the multilayer structure was fed to the feedblock and coextruded as a film of about 30 mils in thickness, and then drawn down to a total thickness about 0.8 mil, and then set on the chill roll in the following transverse layered geometry: A/C/B/B/B/C/A. The resulting 5-layer film, having a compositional gradient of A/C/B/C/A, had skin layers of composition A of about 0.1 mil thickness each, a central core layer of composition B of about 0.3 mil thickness, and intermediate layers of composition C each having a thickness of about 0.1 mil each, to provide a multilayer film having a total thickness of about 0.8 mil. The A composition, having the lower density LLDPE, provides tackiness to the skin layers in this 5-layer film.

COMPARATIVE EXAMPLE 1A

Using the same general procedure as described for Example 1, a multilayer film was prepared from the compositions and layers shown in Table 2.

TABLE 2

| Layer Composition | Resins | % Resin in Layer Composition | Resin as % of Film | Layer as % of Film |
|---|---|---|---|---|
| A | LLDPE-hexene (1) | 30 | 6.0 | 20 |
|   | LLDPE-octene | 70 | 14.0 | |
| B | Propylene homopolymer | 12 | 7.2 | 60 |
|   | LLPPE-octene | 44 | 26.4 | |
|   | LLDPE-hexene (2) | 44 | 26.4 | |
| C | LLDPE-hexene (1) | 30 | 6.0 | 20 |
|   | LLDPE-octene | 70 | 14.0 | |

The resin nomenclature is the same as described above for Example 1. The procedure as previously described for Example 1 was repeated to extrude seven layers in the transverse layer geometry of A/A/B/B/B/C/C to provide a 3-layer film having a compositional gradient of A/B/C and a total thickness of about 0.8 mil.

COMPARATIVE TESTING

Testing on the multilayer films made in the foregoing Examples 1 and 1A were conducted and the results obtained are shown in Table 3.

TABLE 3

| Measurement | Ex. 1 | Comp. Ex. 1A |
|---|---|---|
| Tear strength (g) TD | 550 | 441 |
| Tensile ULT (psi) MD | 9030 | 8284 |
| Tensile ULT (psi) TD | 4600 | 5155 |
| Tensile @ 200% stretch (psi) MD | 2370 | 1508 |
| Tensile @ 200% stretch (psi) TD | 1075 | 1053 |
| Elongation @ Yield (%) MD | 22.20 | 21.40 |
| Elongation @ Yield (%) TD | 18.73 | 20.00 |
| Modulus (psi) MD | 33400 | 29385 |
| Modulus (psi) TD | 33300 | 28290 |
| Puncture strength (lbs.) | 12 | 6.13 |

In Table 3, MD refers to "machine direction" (i.e., the direction of extrusion and take-up), and TD refers to the "transverse direction" thereto.

An important and desirable property for industrial stretch films is a high holding force. Holding force can be measured by performing a standardized test for tensile strength, which typically involves: placing a test strip of film between two holders and subjecting the strip to tension effective to provide a stretch of 50%–150%; determining the value of the tensile force to which the strip is subjected; leaving the test strip in the testing machine for a rather long period of time (e.g., 12 hours); and, finally, reevaluating the tension on the strip. In the best case, there is no change in the tension on the test strip (i.e., it has not stretched or lengthened over time), which indicates that the wrapped article will remain wrapped and that bundle of wrapped articles will not loose due to distortion or stretching of the film.

Films were provided as generally described in Example 1 (i.e., 5-layer A/C/B/C/A, with 80% polypropylene in the C layer, 14.4% polypropylene in the film), Example 1A (i.e., 3-layer A/B/C, 12% polypropylene in the B layer, 7.2% polypropylene in the film overall), and a modified film (3-layer A/B/C, as in Example 1A, but without polypropylene).

Each of these films was tested on a "HydroStretch" film development test system available from Highlight Industries, Inc. (Grandville, Mich.) for holding strength. The results of these tests are depicted in FIG. 1, in which the ordinate (x) represents arbitrary force units and the abscissa (y) represents the resulting percent of linear stretch of the sample in response to such tensile force; the crosses (x) represent the film of Example 1, the circles (○) represent the film of Example 1A, and the squares (□) represent the aforementioned modified 3-layer film. As seen from these graphs, the film of this invention (Example 1) provides the best holding force, i.e., it stretches the least when subjected to a particular stretching force; in practical terms, these results mean that articles wrapped with the present film will be least likely to separate from each other when wrapped together.

EXAMPLE 2

Using the same general procedure and materials as described above for Example 1, a multilayer film is made by extruding the A, B, and C compositions having the transverse layered geometry A/B/B/C/C/B/B/A to produce a 5-layered film A/B/C/B/A.

EXAMPLE 3

Using the same general procedure and materials as described above, a fourth compositional layer D is made having the same composition as the A layer and further including 9-octadecenamide as a slip agent in an amount of about 0.7 wt. %, and then extruded into the transverse compositional layered geometry A/C/B/B/B/C/D to produce a 5-layer film A/C/B/C/D. The D layer, having the release agent, has a reduced tackiness. This film can be referred to as a one-sided cling film, since the A layer is tacky and the D layer (having the slip agent) is slippery.

EXAMPLE 4

Using the same general procedure and materials as described for Example 3, a multilayer film is made having the transverse compositional layered geometry of A/B/B/C/C/B/B/D to produce a 5-layer film A/B/C/B/D.

EXAMPLE 5

Using the same general procedure and materials as described for Example 3, a multilayer film is made having the transverse compositional layered geometry of A/A/B/B/B/C/D to produce the 4-layer film A/B/C/D.

EXAMPLE 6

Using the same general procedure as described for Example 3, a multilayer film is made having the transverse compositional layered geometry of A/A/B/B/B/C/D to produce the 4-layer film A/B/C/D, except that layer D comprises 100% medium density (ρ) polyethylene (e.g., 0.930≤ρ≤0.945). Again, the D layer is slippery, but without the use of a slip agent.

EXAMPLE 7

Using the same general procedure as described for Example 3, a multilayer film is made having the transverse compositional layered geometry of A/A/B/B/B/C/D to produce the 4-layer film A/B/C/D, except that layer D comprises a blend of 45% high density polyethylene (e.g., ρ>0.94) and 55% LLDPE-hexene. Again, the D layer is slippery, but without the use of a slip agent.

As described above, multiple layers of the same composition are extruded only to more easily provide a thicker layer of the same unitary composition in the final product. Examples 3, 4, and 5 provide 4- and 5-layer films having the respective compositions A/C/B/C/D, A/B/C/B/D, and A/B/C/D, although the A, B, C, and D layers will have different thicknesses in the final film.

The invention having been explained with reference to the foregoing description and particular embodiments is defined by the following claims without limiting the scope and spirit of the invention to the specific description, embodiments, and materials used herein for illustration.

What is claimed is:

1. A multilayer film, comprising., at least one core layer comprising a polymer having at least 25% polymerized propylene monomer; and said at least one core layer being sandwiched between skin layers comprising polymers, being the same or different, each having at least 5% polymerized ethylene monomer.

2. The film of claim 1, wherein the film is a non-shrink, stretch film.

3. The film of claim 2, wherein the skin layers comprise at least 50% of a linear low density polyethylene (LLDPE).

4. The film of claim 3, wherein at least one of the skin layers comprises LLDPE-hexene.

5. The film of claim 2, wherein the core comprises propylene homopolymer.

6. The film of claim 5, wherein the core layer comprises at least 50% propylene homopolymer.

7. The film of claim 6, wherein the core layer comprises 70–95% propylene homopolymer.

8. The film of claim 7, wherein the core layer comprises a blend of propylene homopolymer and an ethylene copolymer.

9. The film of claim 8, wherein the core layer comprises a mixture of propylene homopolymer and LLDPE-hexene.

10. The film of claim 2 further comprising at least one additional core layer comprising polymerized ethylene monomer having a composition different than that of either of said skin layers.

11. The film of claim 10, wherein the additional core layer comprises LLDPE-octene.

12. The film of claim 10, wherein said film comprises two additional core layers, each additional core layer disposed between said core and one of said skin layers.

13. The film of claim 10, wherein at least one of said core layers comprises a blend of an ethylene polymer and propylene polymer.

14. The film of claim 8, wherein said core is the thickest layer.

15. The film of claim 9, wherein said core is the thickest layer.

16. The film of claim 2, wherein at least one of said skin layers comprises an amount of LLDPE effective to render said skin layer sufficiently tacky to adhere to the other skin layer.

17. The film of claim 12, wherein at least one of said skin layers comprises an amount of LLDPE effective to render said skin layer sufficiently tacky to adhere to the other skin layer.

18. The film of claim 13, wherein at least one of said skin layers comprises an amount of LLDPE effective to render said skin layer sufficiently tacky to adhere to the other skin layer.

19. The film of claim 8, wherein at least one of said skin layers comprises a slip agent effective to render said skin layer effectively non-tacky.

20. The film of claim 10, wherein at least one of said skin layers comprises a slip agent effective to render said skin layer effectively non-tacky.

21. The film of claim 12, wherein at least one of said skin layers comprises a slip agent effective to render said skin layer effectively non-tacky.

22. The film of claim 2, wherein at least one of said skin layers comprises an amount of a polymer selected from the group consisting of medium density polyethylene, high density ethylene homopolymer, blends thereof, and blends thereof with LLDPE, wherein the medium density polyethylene and high density polypropylene is present in an amount effective to render said skin layer non-tacky.

23. The film of claim 10, wherein at least one of said skin layers comprises an amount of a polymer selected from the group consisting of medium density polyethylene, high density ethylene homopolymer, blends thereof, and blends thereof with LLDPE, wherein the medium density polyethylene and high density polypropylene is present in an amount effective to render said skin layer non-tacky.

24. The film of claim 12, wherein at least one of said skin layers comprises an amount of a polymer selected from the group consisting of medium density polyethylene, high density ethylene homopolymer, blends thereof, and blends thereof with LLDPE, wherein the medium density polyethylene and high density polypropylene is present in an amount effective to render said skin layer non-tacky.

25. The film of claim 2, comprising:
   A. skin layers comprising LLDPE-hexene; and
   B. a core layer comprising a blend of LLDPE and propylene homopolymer.

26. The film of claim 25, wherein the LLDPE in the intermediate layer comprises LLDPE-hexene.

27. The film of claim 2, comprising:
   A. skin layers comprising LLDPE-hexene;
   B. a core layer comprising a blend of LLDPE-hexene and LLDPE-octene; and
   C. at least two intermediate layers, one each between said core layer and each of said skin layers, each comprising a blend of propylene homopolymer and LLDPE.

28. The film of claim 27, wherein each of the skin layers comprises a blend of LLDPE-octene and LLDPE-hexene.

29. The film of claim 27, wherein one of the skin layers comprises a blend of at least 50% LLDPE with up to 50% of medium density polyethylene, high density polyethylene, or a blend thereof.

30. An article of manufacture wrapped in a film, wherein the film comprises at least one core layer comprising a polymer having 25–95% polymerized propylene monomer, and said at least one core layer being sandwiched between skin layers comprising polymers, being the same or different, each having at least 5% polymerized ethylene monomer.

31. The article of claim 30, wherein the film is a non-shrink, stretch film.

32. The article of claim 31, wherein the skin layers comprise at least 50% of a linear low density polyethylene (LLDPE).

33. The film of claim 32, wherein at least one of the skin layers comprises LLDPE-hexene.

34. The film of claim 31, wherein the core comprises propylene homopolymer.

35. The film of claim 34, wherein the core layer comprises at least 50% propylene homopolymer.

36. The film of claim 35, wherein the core layer comprises 70–95% propylene homopolymer.

37. The film of claim 36, wherein the core layer comprises a blend of propylene homopolymer and an ethylene copolymer.

38. The film of claim 37, wherein the core layer comprises a mixture of propylene homopolymer and LLDPE-hexene.

39. The film of claim 31 further comprising at least one additional core layer comprising polymerized ethylene monomer having a composition different than that of either of said skin layers.

40. The film of claim 39, wherein the additional core layer comprises LLDPE-octene.

41. The film of claim 39, wherein said film comprises two additional core layers, each additional core layer disposed between said core and one of said skin layers.

42. The film of claim 39, wherein at least one of said core layers comprises a blend of an ethylene polymer and propylene polymer.

* * * * *